United States Patent [19]

Yasue et al.

[11] Patent Number: 5,799,155

[45] Date of Patent: Aug. 25, 1998

[54] METHOD OF DATA COMMUNICATION AND SYSTEM FOR CARRYING OUT THE METHOD

[75] Inventors: Toshikazu Yasue, Chigasaki; Hidemitsu Higuchi, Yokohama; Toru Horimoto, Atsugi; Yukio Shimamoto; Takahisa Miyamoto, both of Yokohama, all of Japan

[73] Assignee: Hitachi, Ltd., Tokyo, Japan

[21] Appl. No.: 752,712

[22] Filed: Nov. 19, 1996

Related U.S. Application Data

[63] Continuation of Ser. No. 197,514, Feb. 16, 1994, abandoned.

[30] Foreign Application Priority Data

Feb. 22, 1993 [JP] Japan ..................... 5-031575

[51] Int. Cl.⁶ .................................................. G06F 13/00
[52] U.S. Cl. ............................ 395/200.66; 395/200.6
[58] Field of Search ............................ 395/200.66, 200.6

[56] References Cited

U.S. PATENT DOCUMENTS

| | | | |
|---|---|---|---|
| 3,942,155 | 3/1976 | Lawlor | 395/200.66 |
| 4,987,572 | 1/1991 | Scott | 370/91 |
| 4,992,931 | 2/1991 | Hirasawa | 395/200.2 |
| 5,168,561 | 12/1992 | Vo | 395/425 |
| 5,191,653 | 3/1993 | Banks et al. | 395/275 |
| 5,392,406 | 2/1995 | Petersen et al. | 395/325 |
| 5,416,907 | 5/1995 | Polzin et al. | 395/275 |
| 5,511,166 | 4/1996 | Travaglio | 395/200.2 |
| 5,655,140 | 8/1997 | Haddock | 395/200.76 |

OTHER PUBLICATIONS

U.S. application Ser. No. 08/079,872, title Communication Control System and Method, copy of specification, claims and drawings.
Dalton, Chris, et al. "Afterburner—A Network–Independent Card Provides Architectural Support for High–Performance Protocols," IEEE Network, Jul., 1993 pp. 36–43.

*Primary Examiner*—Eric Coleman
*Attorney, Agent, or Firm*—Fay, Sharpe, Beall, Fagan, Minnich & McKee

[57] ABSTRACT

A data communication system comprising a system processor, an application program assigned to an application buffer it controls, a communication protocol program assigned to a protocol buffer it controls, a communication controller for controlling communication lines, and transmitting and receiving buffers controlled by the communication controller. Data is copied at high speed among the application buffer, protocol buffer, and transmitting and receiving buffers in the same byte-based increments as those in which the system processor handles data. The fast data movement among the buffers boosts the throughput of the entire communication system.

16 Claims, 13 Drawing Sheets

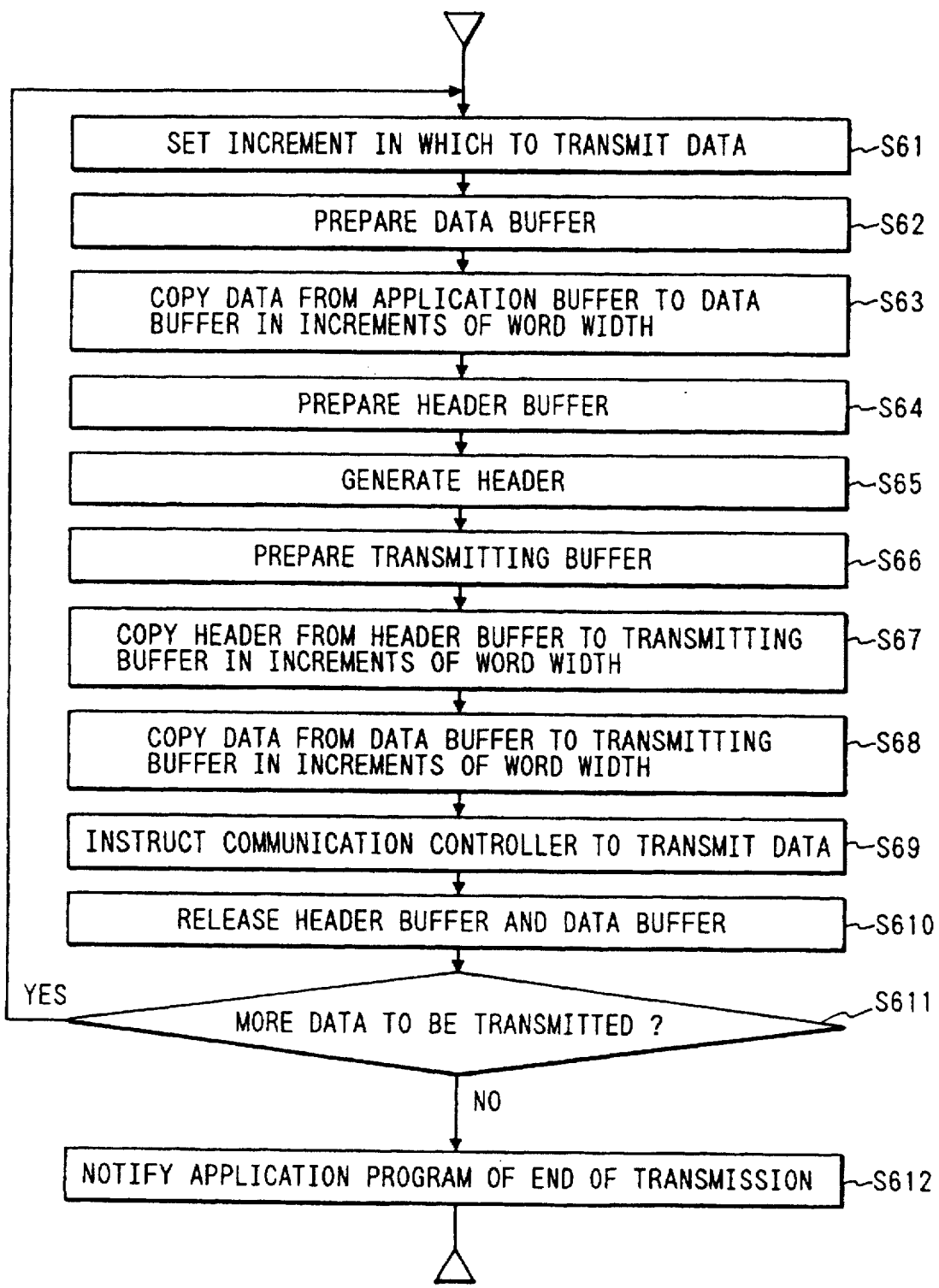

| LOW-ORDER 2 BITS OF HEADER LENGTH (DECIMAL) | ADDRESS BOUNDARY |
|---|---|
| 0 | WORD BOUNDARY |
| 1 | THREE-BYTE BOUNDARY |
| 2 | TWO-BYTE BOUNDARY |
| 3 | ONE-BYTE BOUNDARY |

METHOD OF DATA COMMUNICATION AND SYSTEM FOR CARRYING OUT THE METHOD

This application is a continuation of U.S. application Ser. No. 08/197,514, filed on Feb. 16, 1994 now abandoned.

BACKGROUND OF THE INVENTION

The present invention relates to a method of data communication and a system for carrying out the same. More particularly, the invention relates to a method of high-speed data communication and a high-speed data communication system carrying out the method in conjunction with a local area network (LAN).

FIG. 2 is a view of a program structure for use by a data communication system according to the invention. This system permits personal computers and workstations to perform data communication over high-speed transmission routes such as LAN's. This applicant has already filed U.S. Ser. No. 08/079,872 abandoned for FWC in connection with the above data communication system.

FIG. 2 highlights a buffer constitution showing how data to be communicated is related to buffers that accommodate it in the data communication system. A transmitter 6 and a receiver 7 are connected to a transmission line 13 through which data is exchanged. The transmitter 6 comprises an application program 60, a transmitting program 63 and a communication controller 68. The program 60 is assigned an application buffer 61 that accommodates application data 62. The transmitting program 63 is assigned a data buffer 64 that temporarily holds part 65 of the application data 62, and a head buffer 66 that temporarily stores communication protocol header information 67. The communication controller 68 is assigned a transmitting buffer 69 that temporarily contains frame data 610 made of header information and application data. The application program 60 and transmitting program 63 are placed in a system memory of the transmitter 6 and processed by a system processor thereof. The system memory and system processor of the transmitter 6 are not shown in FIG. 2. The receiver 7 is composed of an application program 70, a receiving program 73 and a communication controller 76. The application program 70 is assigned an application buffer 71 for holding the application data 72 received. The receiving program 73 is assigned a protocol buffer 74 that temporarily stores part 75 of the application data 72. The communication controller 76 is assigned a receiving buffer 77 that temporarily accommodates frame data 78 received. The application program 70 and receiving program 73 are placed in a system memory of the receiver 7 and processed by a system processor thereof. The system memory and system processor of the receiver 7 are not shown in FIG. 2. In FIG. 2, the transmitter 6 divides the application data 62 in the application buffer 61 into pieces and sends them onto the transmission line 13 via the data buffer 64 and transmitting buffer 69. The receiver 7 receives the pieces of data via the receiving buffer 77 and protocol buffer 74 into the application buffer 71 where the pieces are reassembled.

One drawback of this inventor's previous invention is the absence of consideration for the amount to be divided of the application data 62. Also not considered are the locations in which to store data in the buffers involved. If the data starting address boundaries fail to coincide with each other upon data copy between two buffers, it takes time to do the copying therebetween. The result is a drop in performance.

In FIG. 2, the system processor of the transmitter 6 and that of the receiver 7 are a 32-bit processor each, the processors handling data in increments of four bytes. The starting address in each buffer is located so that the address will be an integer multiple of the minimum byte length. That location is called a word boundary. FIG. 3 shows how data is typically moved between buffers. The buffers in FIG. 3 each have the same constitution as that depicted in FIG. 2 and identified by the same reference numerals. Each division in a buffer represents a one-byte address, the addresses getting higher from left to right. Each of the inverted triangles points to a word boundary. The location one byte higher than a given word boundary is called a one-byte boundary; two bytes higher, a two-byte boundary; three bytes higher, a three-byte boundary. In general, the 32-bit processor can read data four bytes at a time from word boundaries in the system memory but cannot gain access to that memory across any word boundary. This means that upon data copy, data may be moved from a copy source to a copy destination simply in increments of four bytes if the word boundaries coincide therebetween; if the word boundaries do not match between the source and the destination, data needs to be moved from one to the other in increments or one or two bytes. In the latter case, the increased number of times the memory is accessed means more time required for the copy operation. FIG. 3 shows an example in which 10 bytes of application data 621 are transmitted first, followed by another 10 bytes of application data 622. The header information is composed of five bytes. Because the starting address of the application data 622 is stored on a two-byte boundary, data is copied from the application buffer 61 to the data buffer 64 in five increments of two bytes each. The header information is copied from the data buffer 64 to the transmitting buffer 69 in two divisions, i.e., four bytes and one byte. Meanwhile, the data is copied from the data buffer 64 to the transmitting buffer 69 in 12 increments of one byte each. The frame data received from the starting address of the receiving buffer 77 via the transmission line 13 is copied in three increments of four bytes each and in three increments of one byte each to the protocol buffer 74. Between the application buffer 71 and the protocol buffer 74, starting address boundaries do not coincide with each other. This requires copying the data from the protocol buffer 74 to the application buffer 71 in 10 increments of one byte each.

SUMMARY OF THE INVENTION

It is therefore an object of the present invention to provide a method of high-speed data communication and a system for carrying out the same in copying data between buffers at high speed.

In carrying out the invention and according to one aspect thereof, there is provided a method of data communication comprising the steps of having a processor process communication protocols by a program, using a local memory through which to transmit and receive communication data, having a system memory store the program and the communication data, and adjusting increments in which to transmit application data for data communication, wherein the processor is arranged to handle data in increments of a word width, and wherein the increments are set for an integer multiple of the word width in transmitting and receiving the communication data.

When embodied as outlined, the invention allows data to be transmitted and received in increments of the word width. This boosts the rate of data copy between buffers and thereby provides high-speed data communication.

These and other objects, features and advantages of the invention will become more apparent upon a reading of the following description and appended drawings.

3

BRIEF DESCRIPTION OF THE DRAWINGS

FIG. 6 is a flowchart of steps in which a transmitting program of the invention typically operates;

DETAILED DESCRIPTION OF THE PREFERRED EMBODIMENTS

Preferred embodiments of the invention will now be described with reference to the accompanying drawings.

Figure 1:
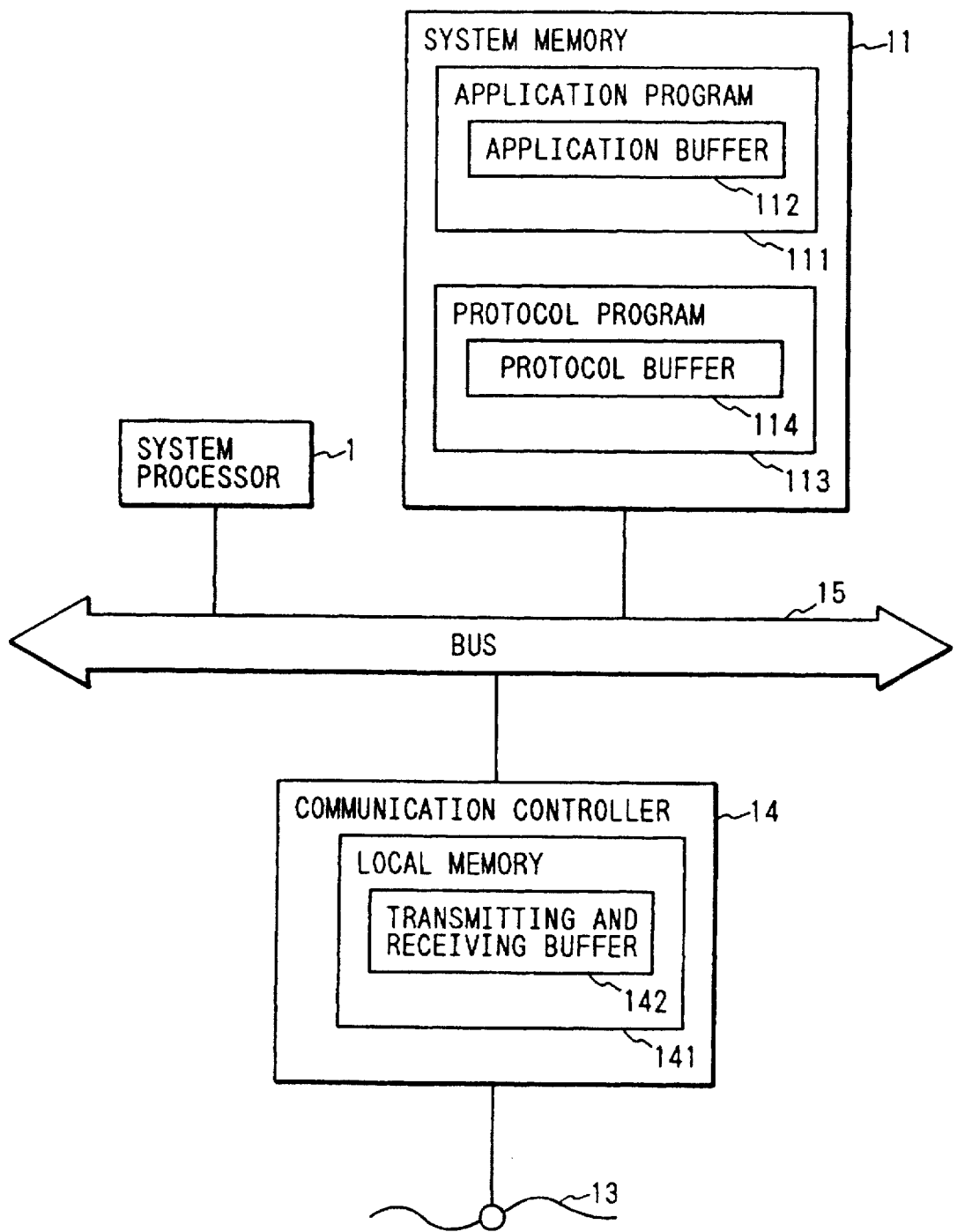
FIG. 1 is a block diagram of a data communication system embodying the invention.

FIG. 1 is a block diagram of one data communication system embodying the invention. This system comprises a system processor 1 for executing communication protocols, a system memory 11, and a communication controller 14 for transmitting and receiving data while controlling a transmission line 13. A bus 15 interconnects these components and allows them to exchange control codes, communication data, etc. therebetween. The system processor 1 and system memory 11 combine to process the communication protocols, run application programs and provide overall control on the data communication system. The system memory 11 accommodates communication data besides storing various program codes to be executed by the system processor 1. Programs run by the system include a protocol program 113 for processing the communication protocols, and an application program 111, as shown in FIG. 1. The protocol program 113 is assigned with a protocol buffer 114 and the application program 111 is assigned with a application buffer. The communication controller 14 comprises a local memory 141 which in turn contains a transmitting and receiving buffer 142. The local memory 141 is accessed by the system processor 1 in the same manner as the system memory 11. In FIG. 1, it is assumed that the system processor 1 is a 32-bit processor having a word width of four bytes and that the system memory 11 and local memory 141 have addresses with word boundaries in increments of four bytes. It follows that the system processor 1 may write and read data to and from the system memory 11 or local memory 141 in increments of four bytes, i.e., between word boundaries.

Figure 2:
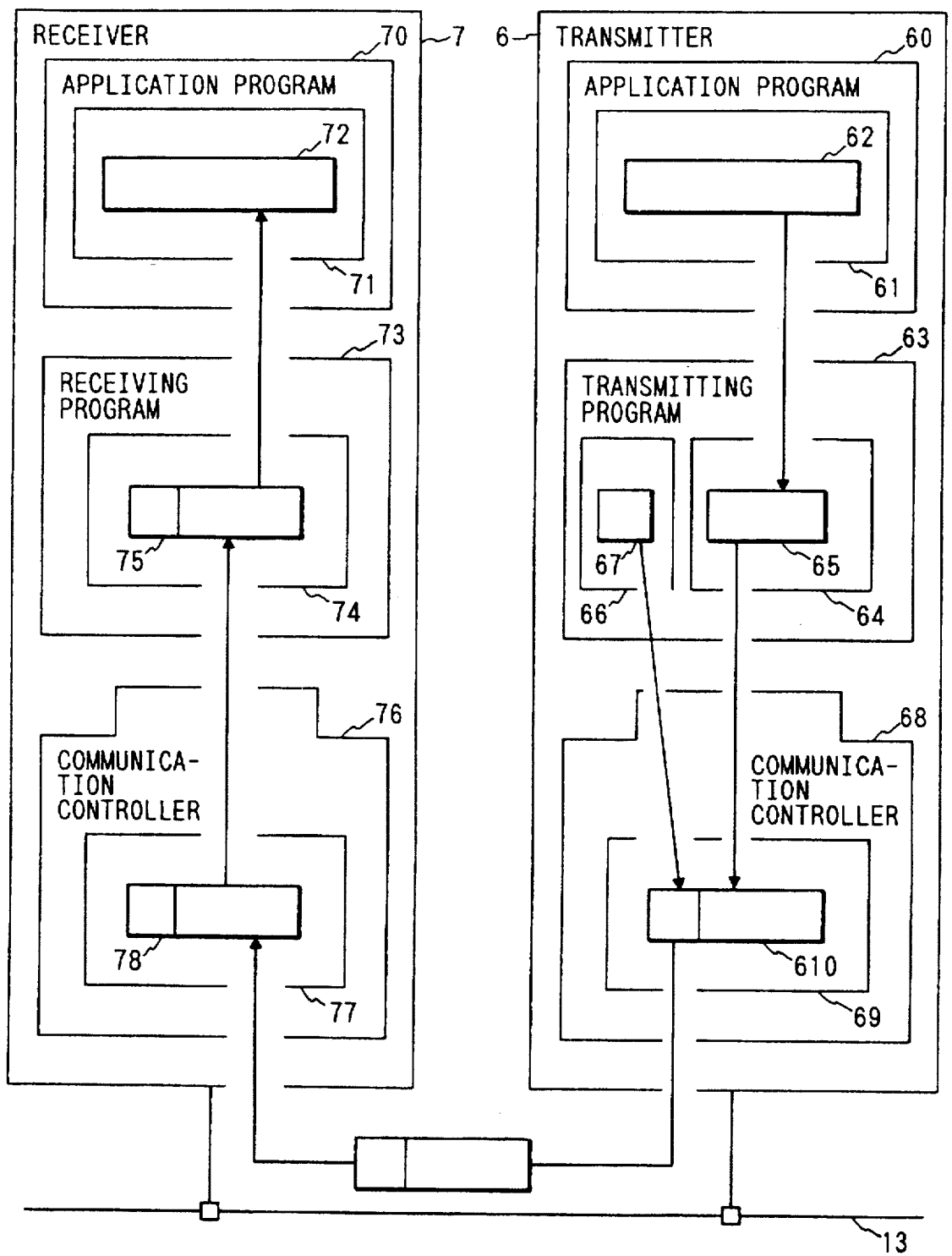
FIG. 2 is a view of a program structure for use by the embodiment.

FIG. 2 is a view of a program structure used by the data communication system of FIG. 1 as it is applied to the transmitter 6 and receiver 7. The transmitter 6 and receiver 7 in FIG. 2 are each composed of the data communication system of FIG. 1. The application program 111 in FIG. 1 corresponds to the application programs 60 and 70 in FIG. 2; the application buffer 112 in FIG. 1, to the application buffers 62 and 72 in FIG. 2; the protocol program 113 in FIG. 1, to the transmitting program 63 and receiving program 73 in FIG. 2; the protocol buffer 114 in FIG. 1, to the data buffer 64, header buffer 66 and protocol buffer 74 in FIG. 2; the communication controller 14 in FIG. 1, to the communication controllers 68 and 76 in FIG. 2; and the transmitting and receiving buffer 142 in the local memory of FIG. 1, to the transmitting buffer 69 and receiving buffer 77 in FIG. 2.

Figure 4:
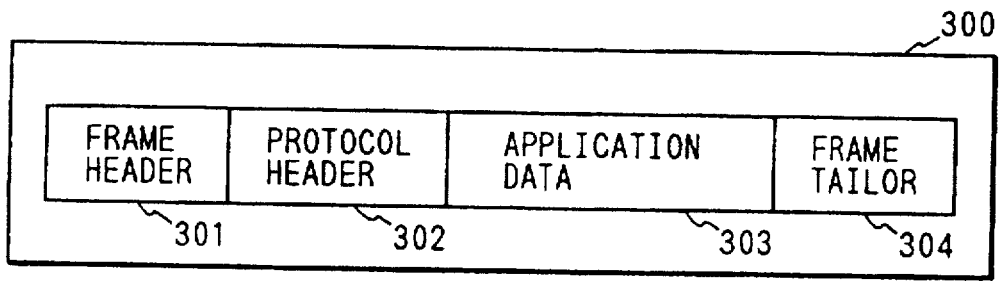
FIG. 4 is a view of a frame format for data processing according to the invention.

A data frame that flows through the transmission line 13 takes on the format shown in FIG. 4. In FIG. 4, the data frame 300 comprises a frame header 301, a protocol header 302, application data 303 and a frame tailor 304. The frame header 301 includes destination address information and the frame tailor 304 contains check code information for detecting data error. The frame header 301 is generated by the transmitting program 63 of FIG. 2 and interpreted by the communication controller 76 and receiving program 73. The protocol header 302 is generated by the transmitting program 63 and interpreted by the receiving program 73. The frame tailor 304 is generated and interpreted by the communication controllers 68 and 76, respectively. The application data 303 is part of the data moved from the application program 60 to the application program 70. The application data 303 needs to be divided into pieces when transmitted because the transmission line 13 is capable of carrying only a limited amount of data at a time.

Figure 5:
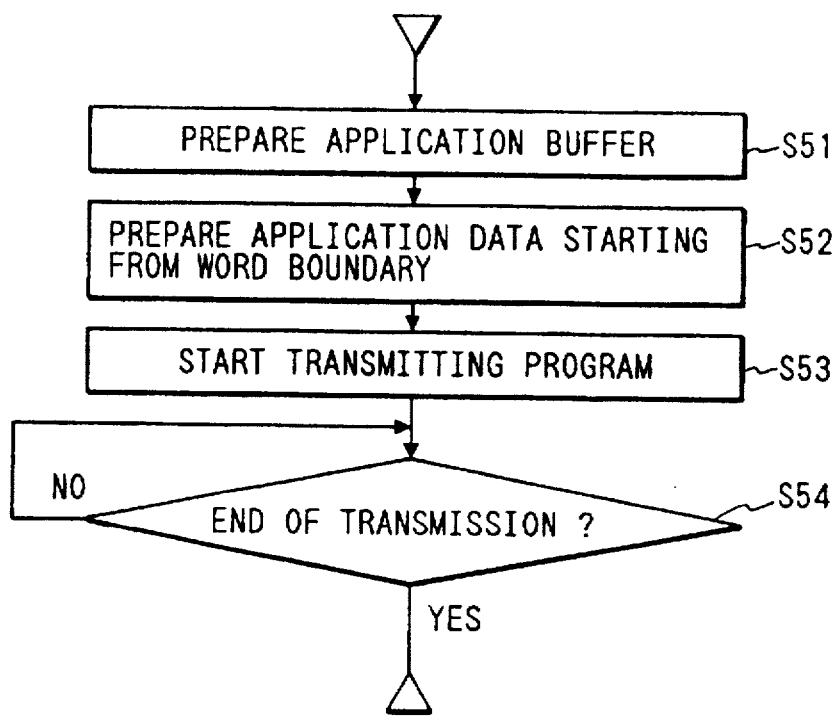
FIG. 5 is a flowchart of steps in which an application program of the invention typically operates on the transmitting side.

How the transmitter 6 of FIG. 2 works will now be described. The application program 60 operates in the steps making up the flowchart of FIG. 5. In step 51 of FIG. 5, the application buffer 61 of the transmitter 6 is allocated so that the starting address will be on a word boundary in the system memory 11. In step 52, the application data 62 is prepared in the application buffer 61. In step 53, the transmitting program of FIG. 2 is started. In step 54, a check is made to see if the transmitting program 63 has reported an end of transmission.

When the application program 60 designates data transmission, the transmitting program 63 operates in the steps shown in FIG. 6. In step 61 of FIG. 6, the increment in which to transmit application data is set for an integer multiple of the word width in accordance with the maximum amount of data that may be transmitted over the transmission line 13 at a time.

Figures 9, 10:
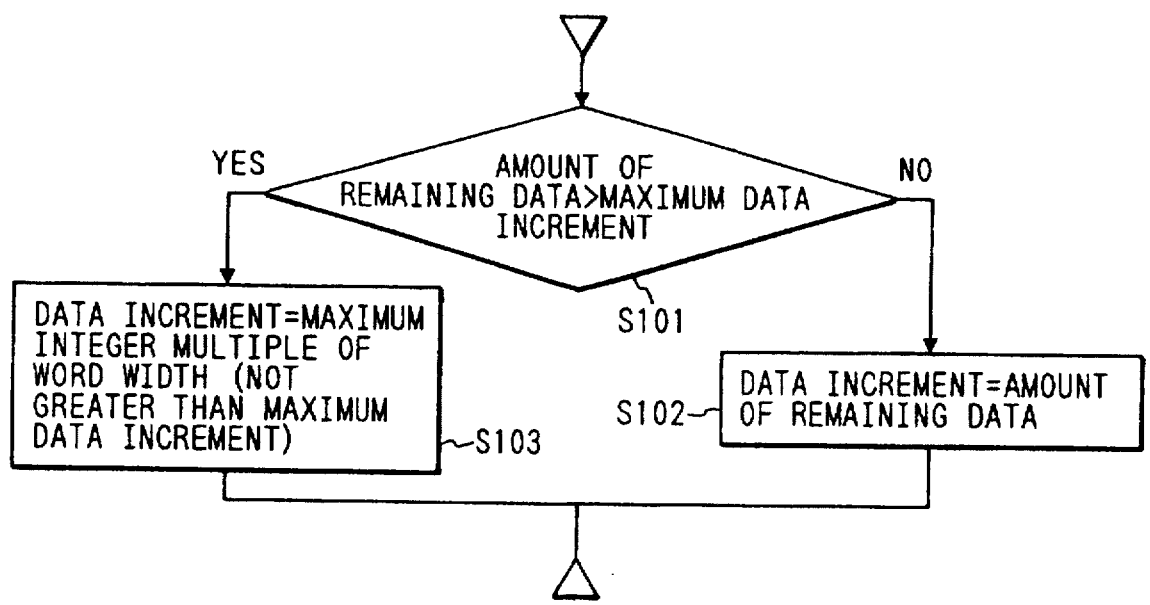
FIG. 9 is a view of an address boundary determining table for data processing according to the invention.
FIG. 10 is a flowchart of steps for calculating the increment in which to transmit data according to the invention.

FIG. 10 is a flowchart of steps for calculating the increment in which to transmit data. In step 101 of FIG. 10, the amount of application data yet to be transmitted is compared with the maximum increment of data transmission over the transmission line 13. If the remaining application data is equal to or less than the maximum data increment, step 102 is reached in which the remaining data is set as the amount of data to be transmitted. If the remaining data is greater than the maximum data increment, step 103 is reached in which the amount of data to be transmitted is limited to the maximum data increment, i.e., an integer multiple of the word width for the system processor.

For example, suppose that the transmission line 13 in FIG. 2 is based on the Ethernet (registered trademark of Xerox Inc.) standardized network of IEEE 802.3 specifications and that the transmitting program 63 and receiving program 73 handles TCP/IP (Transmission Control Protocol/Internet Protocol). In that case, the total length of the protocol header 302 and application data 303 is limited to a maximum of 1,500 bytes. Because the standard length of the protocol header 302 is 40 bytes, i.e., the length of the TCP/IP header, the maximum increment in which to transmit application data 303 at a time is 1,460 bytes. If the word width of the system processors in the transmitter 6 and receiver 7 is four bytes, the amount of data to be transmitted equals the maximum data increment of 1,460 bytes in step 103 of FIG. 10. A typical way to calculate the amount of data to be transmitted is by dividing the maximum data increment by four and discarding the fractions. Another way to make the calculation is by simply expressing the maximum data increment in binary and setting the low-order two bits to zero.

If the system processor for the transmitter 6 and receiver 7 is a 64-bit processor with a word width of eight bytes, the amount of data to be transmitted at a time is 1,456 bytes. Although this amount is four bytes less than the maximum data increment, it permits high-speed data copy between buffers. The result improves performance of data communication.

In step 62 of FIG. 6, the data buffer 64 equivalent in capacity to the data increment calculated above is prepared. The starting address of the data buffer 64 is located on a word boundary. In step 63, part of the application data 62 is copied from the application buffer 61 to the data buffer 64 in increments of the word width. In step 64, the header buffer 66 equivalent in capacity to at least the header length of the communication protocols is prepared. In step 65, header information is generated in the header buffer 66. At this point, the address immediately following the stored header information is arranged to be located on a word boundary.

A starting address boundary for header information is obtained illustratively using the table given in FIG. 9. The table in FIG. 9 shows address boundaries as they are related to the low-order two bits of header lengths in binary (i.e., decimal numbers). For example, a header length of 40 bytes is 101000 in binary, of which the low-order two bits are zero. According to the table of FIG. 9, the address boundary in this case is a word boundary. Thus the header information is to be stored starting at a word boundary. Likewise, when the header is 41 bytes long, the header information may be stored starting at a three-byte boundary according to FIG. 9.

In step 66 of FIG. 6, the transmitting buffer 69 is prepared in the local memory of the communication controller 68. In step 67, the header information 67 is copied from the header buffer 66 to the transmitting buffer 69 in increments of the word width. In step 68, the application data 65 is copied following the header information from the data buffer 64 to the transmitting buffer 69 in increments of the word width.

At this point, the starting address of the application data is arranged to be located on a word boundary in the transmitting buffer 69. As described in connection with step 65 of FIG. 6, the starting address boundary on which the header is to be located is readily obtained using the table FIG. 9. In step 69, the communication controller 68 is instructed to transmit data. In step 610, the data buffer 64 and header buffer 66 are released from their occupied state. In step 611, a check is made to see if there still exists data to be transmitted. If there does exist data to be sent, step 61 is reached again from which the above process is restarted. If there remains no data to be transmitted, step 612 is reached. In step 612, the application program 60 is notified of the end of data transmission. Upon receipt of an instruction of data transmission from the transmitting program 63, the communication controller 68 outputs the frame data 610 from the transmitting buffer 69 onto the transmission line 13. At the end of the transmission, the communication controller 68 releases the transmitting buffer 69.

In the flowchart of FIG. 6, the application program 60 and transmitting program 63 act to perform data transmission to the end once given the instruction from the communication controller 68. Alternatively, the two programs may be arranged to wait for an acknowledge response from the receiver 7.

Figure 7:
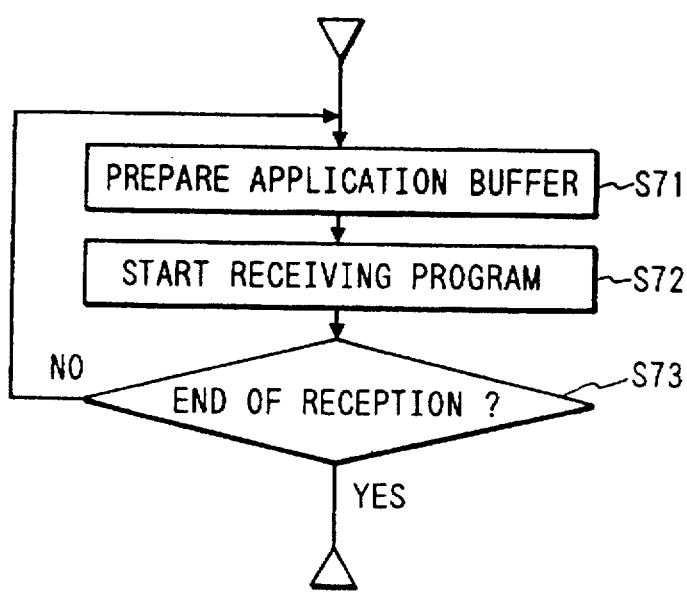
FIG. 7 is a flowchart of steps in which an application program of the invention typically operates on the receiving side.

How the receiver 7 operates will now be described. The application program 70 operates in the steps constituting the flowchart of FIG. 7. In step 71 of FIG. 7, the application buffer 71 for reception is allocated so that the starting address will be on a word boundary in the system memory. In step 72, the receiving program 73 of FIG. 2 is started. In step 73, a reception end report is awaited from the receiving program 73.

Figure 8:
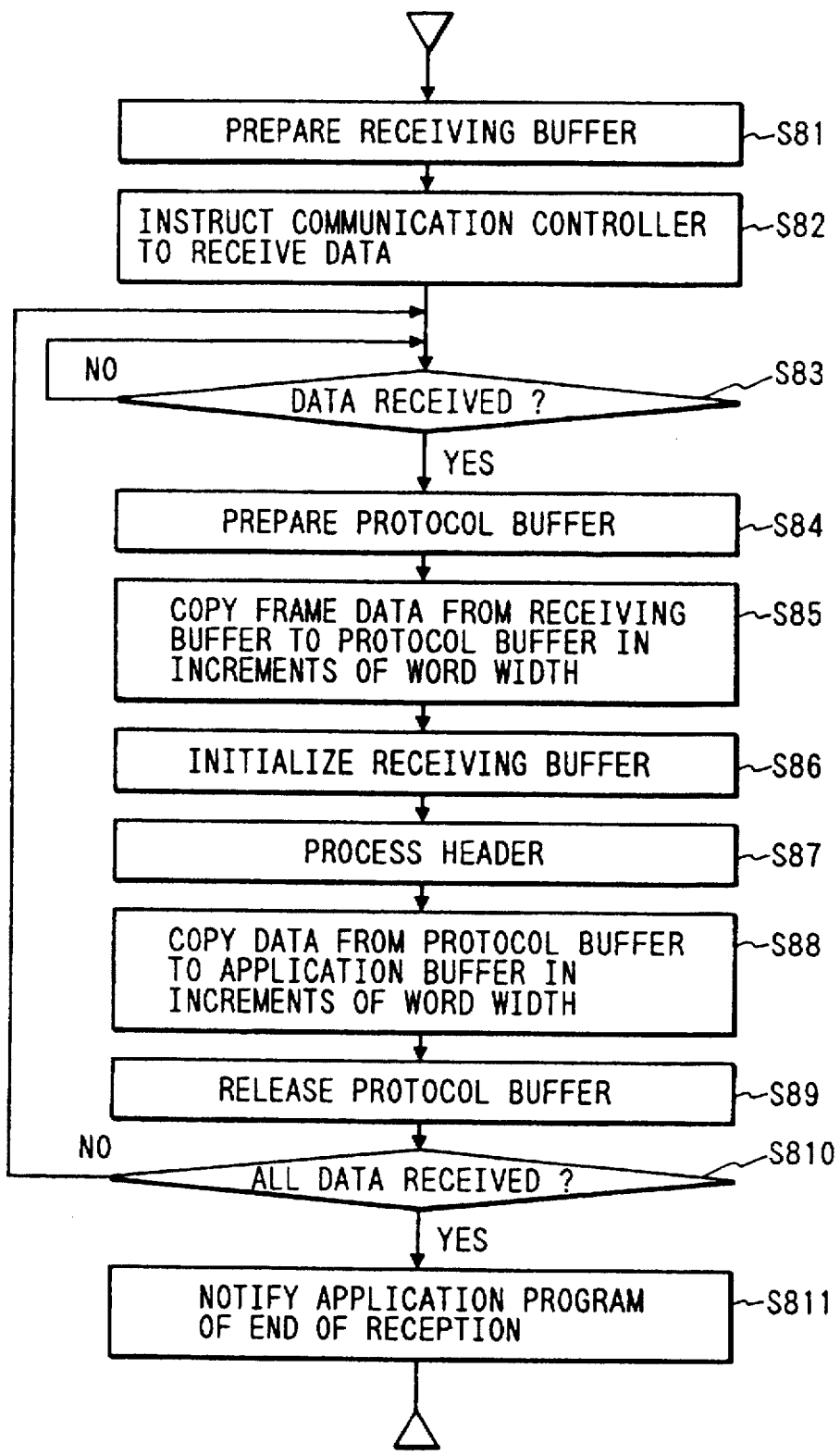
FIG. 8 is a flowchart of steps in which a receiving program of the invention typically operates.

When the application program 70 issues an instruction of data reception, the receiving program 73 starts to operate in the steps constituting the flowchart of FIG. 8. In step 81 of FIG. 8, one or a plurality of receiving buffers 77 are prepared in the local memory of the communication controller 76. In step 82, the communication controller 76 receives the instruction of data reception. At this point, the instruction is given so that the starting address for the application data will be located on a word boundary upon receipt of the frame. The starting address boundary at which to receive the frame is readily obtained using the table of FIG. 9, as described in connection with step 65 of FIG. 6. In step 83, a report of data reception is awaited from the communication controller 76. On receiving the frame data from the communication line 13 into the receiving buffer 77, the communication controller 76 notifies the receiving program 73 thereof. When notified of the data reception by the communication controller 76, the receiving program 73 goes to step 84 of FIG. 8. In step 84, the protocol buffer 74 is prepared. In step 85, the frame data 78 is copied from the receiving buffer 77 to the protocol buffer 74 in increments of the word width. At this point, the frame data is copied so that the starting address of the application data will coincide with a word boundary in the protocol buffer. The starting address boundary at which to store the frame is acquired easily using the table of FIG. 9, as described in connection with step 65 of FIG. 6. In step 86, the receiving buffer 77 used above is initialized for another data reception process. In step 87, the header information from among the frame data 75 in the protocol buffer 74 is processed. In step 88, the application data except for the header information is retrieved and copied into the application buffer 71 starting at the location immediately following the already received data. At this point, the starting address at which to store the next data is also on a word boundary because the length of the preceding data is a multiple of the word width. With the application buffer 71 thus matching the protocol buffer 74 in terms of data address boundary, data may be copied to the two buffers in increments of the word width. In step 89, the protocol buffer 74 is released from its occupied state. In step 810, a check is made to see if there still exists data to be received. If there does remain data to be received, step 83 is reached again for another data reception process. If all data is found to be received, step 811 is reached. In step 811, the application program 70 is notified of the end of data reception, and the process comes to an end.

Figure 3:
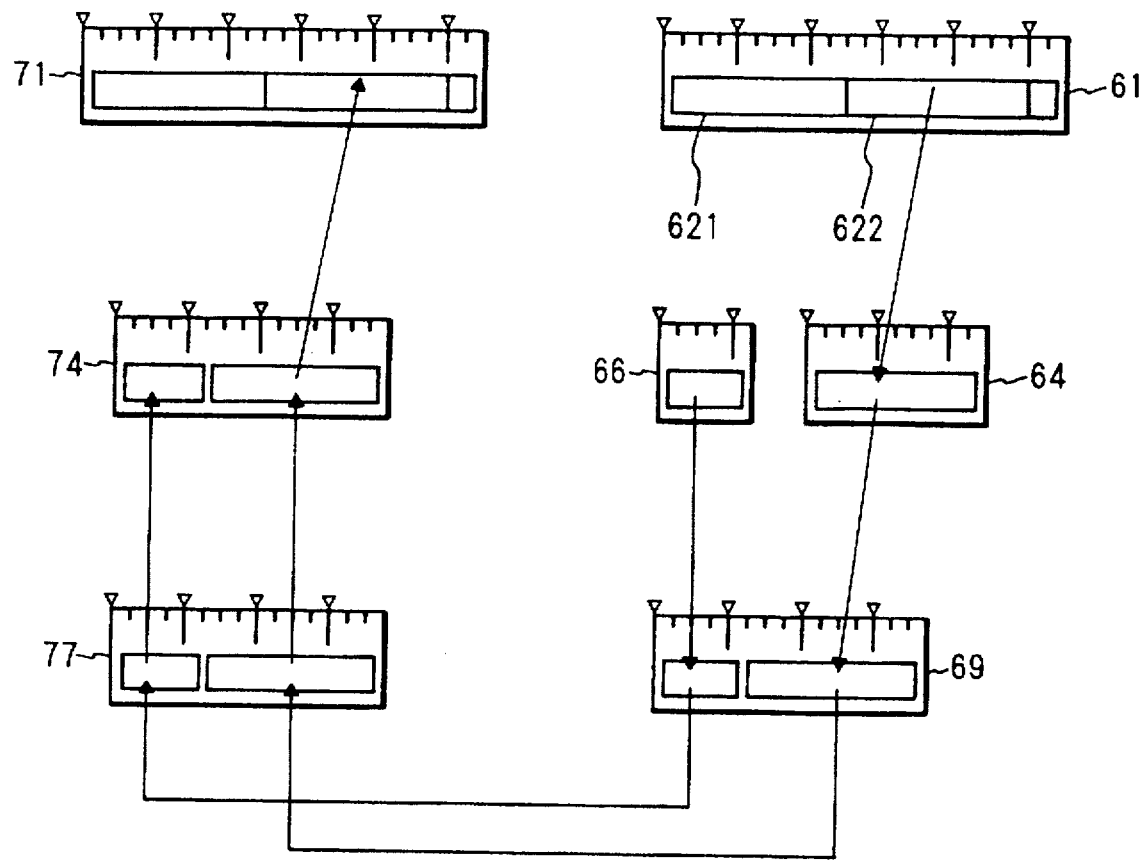
FIG. 3 is a view depicting how data is typically moved according to the inventor's previous invention.
Figure 11:
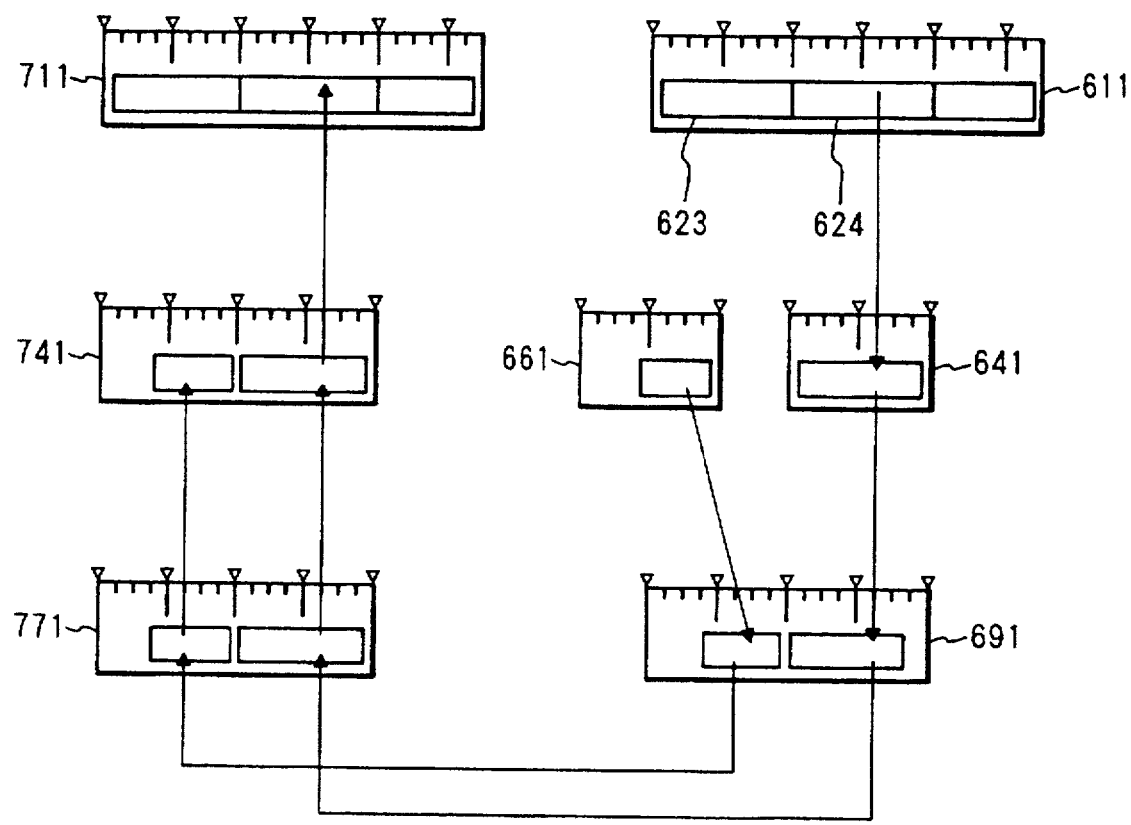
FIG. 11 is a view showing how data is typically moved according to the invention.

FIG. 11 shows how data is typically moved between buffers when the data communication system of FIG. 2 is operated according to the flowcharts of FIGS. 5, 6, 7 and 8. As in FIG. 3, each division in a buffer represents a one-byte address, the addresses getting higher from left to right. Each of the inverted triangles points to a word boundary. In the example of FIG. 11, the maximum increment in which to transmit data over the transmission line at a time is 10 bytes. Since the word width of the system processor is four bytes, the increment in which to transmit application data is set for eight bytes, starting from step 61 of FIG. 6. The example of FIG. 11 shows that after the first eight bytes of application data 623 are transmitted from the application buffer 611, the next eight bytes of application data 624 are being transmitted and received. The header information for use with the communication protocols is five bytes long. According to steps 63, 65 and 67 in FIG. 6, the starting address of the application data and that of the header information are on a word boundary and a three-byte boundary, respectively, the data and the information being held in a data buffer 641, a header buffer 661 and a transmitting buffer 691 on the transmitter side. At this point, data may be copied from the application buffer 611 to the data buffer 641 in increments of the word width (i.e., 4 bytes) because the starting address boundaries in the two buffers coincide with each other. For the same reason, data may be copied at high speed in increments of the word width from the data buffer 641 to the transmitting buffer 691.

On the receiver side, the starting address of the frame data to be stored in a protocol buffer 741 and the corresponding address in a receiving buffer 771 are determined to be on a three-byte boundary each according to steps 82 and 85 of FIG. 8. Because the starting address boundaries in the two buffers coincide with each other, received frame data may be copied in increments of the word width. For the same reason, the application data may be copied from the protocol buffer 741 to an application buffer 711 at high speed in increments of the word width.

Another data communication system embodying the invention will now be described with reference to FIGS. 12 through 16. On the one hand, the data communication system of FIG. 1 is a system in which the communication controller incorporates a local memory and reads and writes data between it and the transmission line. On the other hand, the embodiment of FIG. 12 is a system memory direct connection type data communication system in which data over the transmission line is written and read directly to and from a system memory.

Figure 12:
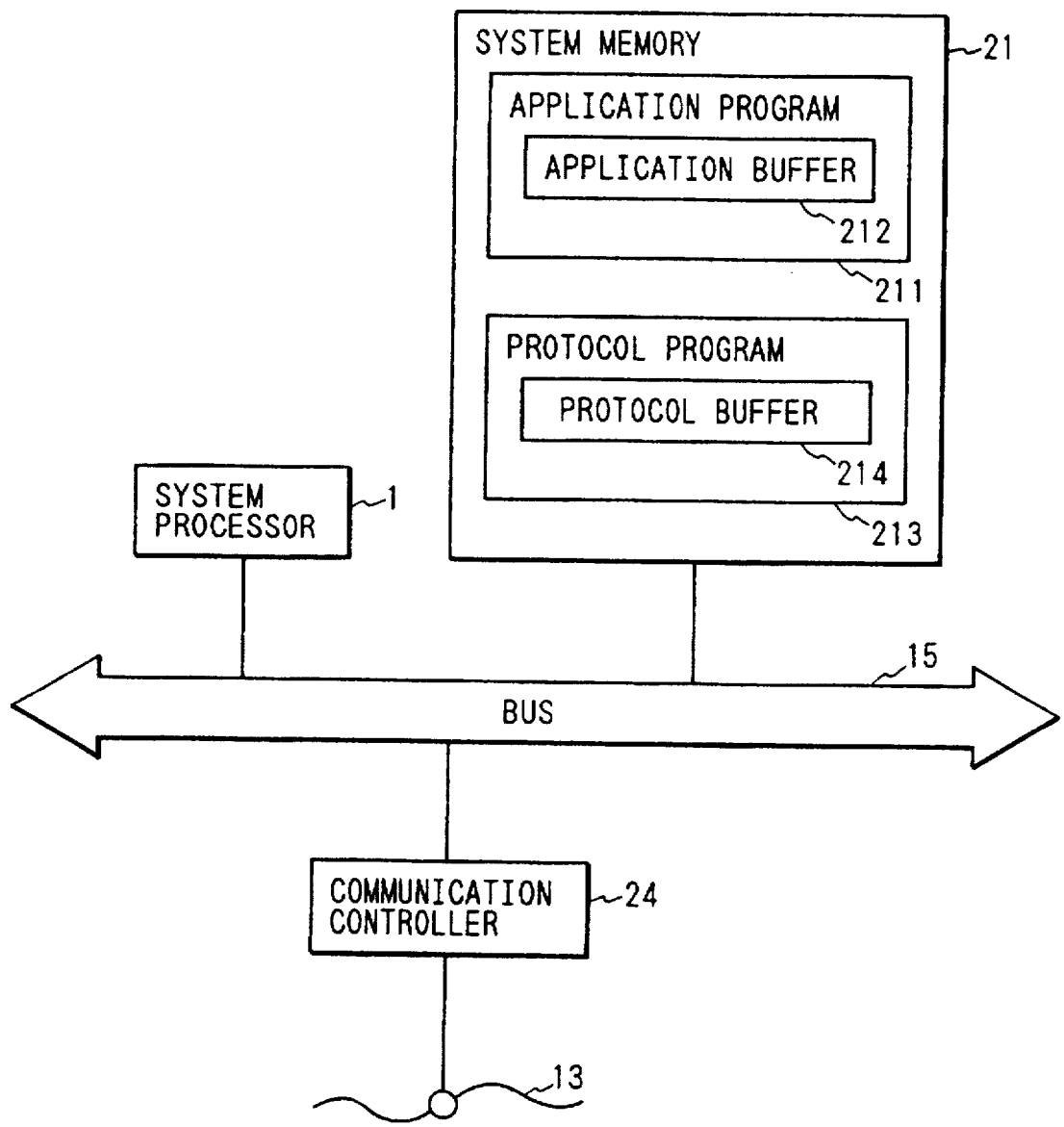
FIG. 12 is a block diagram of another data communication system embodying the invention, the system being connected directly to a system memory.

FIG. 12 is a block diagram of the system memory direct connection type data communication system embodying the invention. In FIG. 12, the data communication system comprises a system processor and a system memory 21 for executing communication protocols, and a communication controller 24 for transmitting and receiving data while controlling a transmission line 13. A bus 15 interconnects these components and allows them to exchange information therebetween. The data exchanged includes control codes and communication data. In this setup, the system processor 1 and system memory 21 combine to process the communication protocols, to execute application programs and to provide overall control on the entire communication system. Besides storing various program codes for use by the system processor 1, the system memory 21 accommodates data to be communicated. The programs provided include a protocol program 213 and an application program 211, as shown in FIG. 12. The protocol program 213 is assigned a protocol buffer 214 and the application program 211 is assigned an application buffer 212. In FIG. 12, it is assumed that the system processor 1 is a 32-bit processor with a word width of four bytes and that the system memory 21 has word boundaries arranged in increments of four bytes. It follows that the system processor 1 may write and read data to and from word boundaries in the system memory 21, four bytes at a time.

Figure 13:
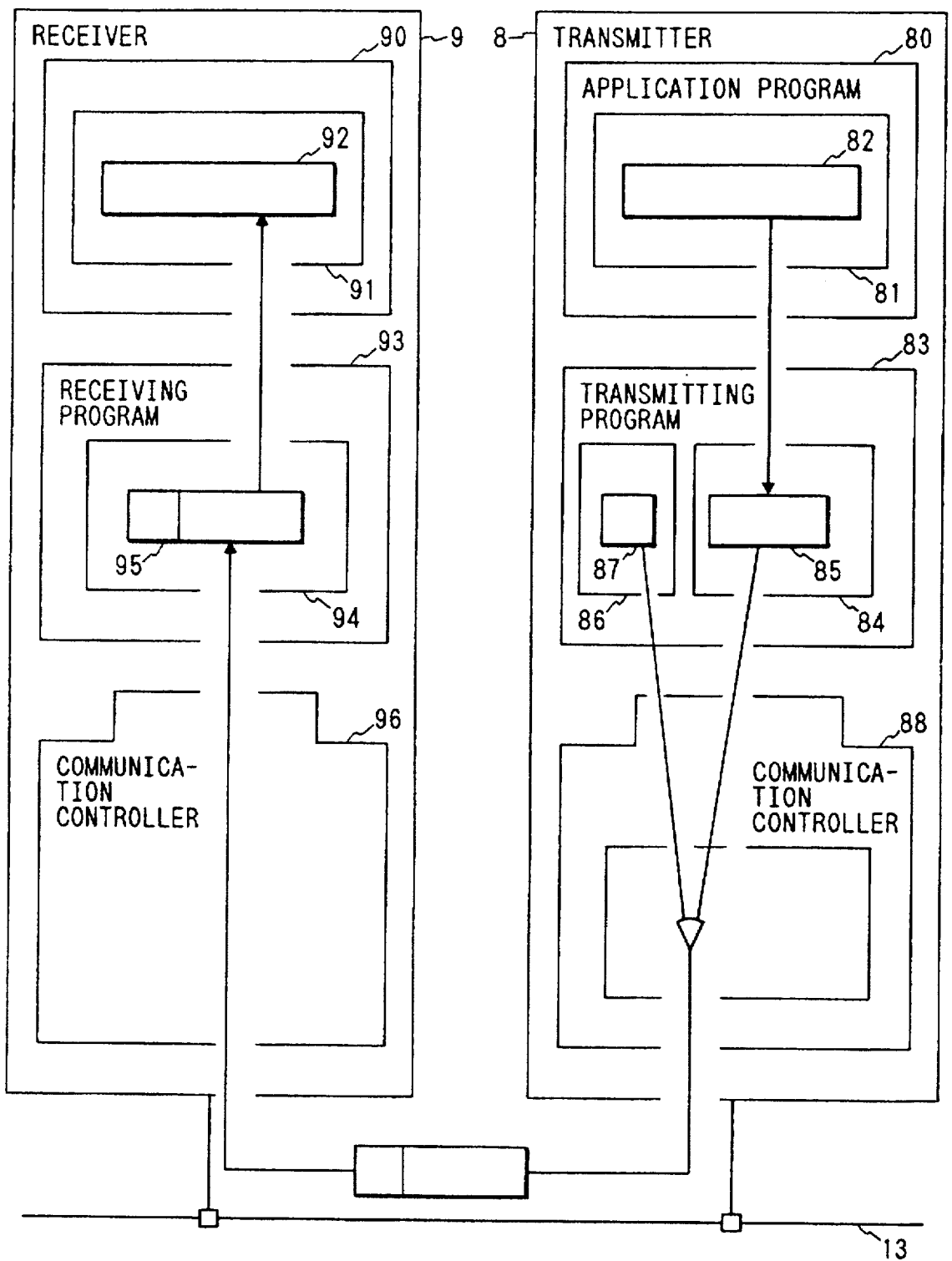
FIG. 13 is a view of a program structure for use by the system memory direct connection type data communication system of FIG. 12.

FIG. 13 is a view of a program structure for use by the system of FIG. 12 as it is applied to a transmitter 8 and a receiver 9 for data communication. The transmitter 8 and receiver 9 in FIG. 13 are each composed of the data communication system of FIG. 12. The application program 211 in FIG. 12 corresponds to application programs 80 and 90 in FIG. 13; the application buffer 212 in FIG. 12, to application buffers 81 and 91 in FIG. 13; the protocol program 213 in FIG. 12, to a transmitting program 83 and a receiving program 93 in FIG. 13; the protocol buffer 214 in FIG. 12, to a data buffer 84, a header buffer 86 and a protocol buffer 94 in FIG. 13; and the communication controller 24 in FIG. 12, to a communication controllers 88 and 96 in FIG. 13.

A data frame that flows through the transmission line 13 is in the same format as that in FIG. 4. In FIG. 4, the data frame 300 comprises the frame header 301, protocol header 302, application data 303 and frame tailor 304. The frame header 301 includes destination address information and the frame tailor 304 contains check code information for detecting data error. The frame header 301 is generated by the transmitting program 83 of FIG. 13 and interpreted by the communication controller 96 and receiving program 93. The protocol header 302 is generated by the transmitting program 83 and interpreted by the receiving program 93. The frame tailor 304 is generated and interpreted by the communication controllers 88 and 96, respectively. The application data 303 is part of the data moved from the application program 80 to the application program 90. The application data 303 needs to be divided into pieces when transmitted because the transmission line 13 is capable of carrying only a limited amount of data at a time.

How the transmitter 8 of FIG. 13 works will now be described. The application program 80 operates in the same steps as those constituting the flowchart of FIG. 5. In step 51, the application buffer 81 for data transmission is allocated so that the starting address will be on a word boundary in the system memory. In step 52, application data is prepared in the application buffer 81. In step 53, the transmitting program 83 of FIG. 13 is started. In step 54, a check is made to see if the transmitting program 83 has reported an end of transmission.

Figure 14:
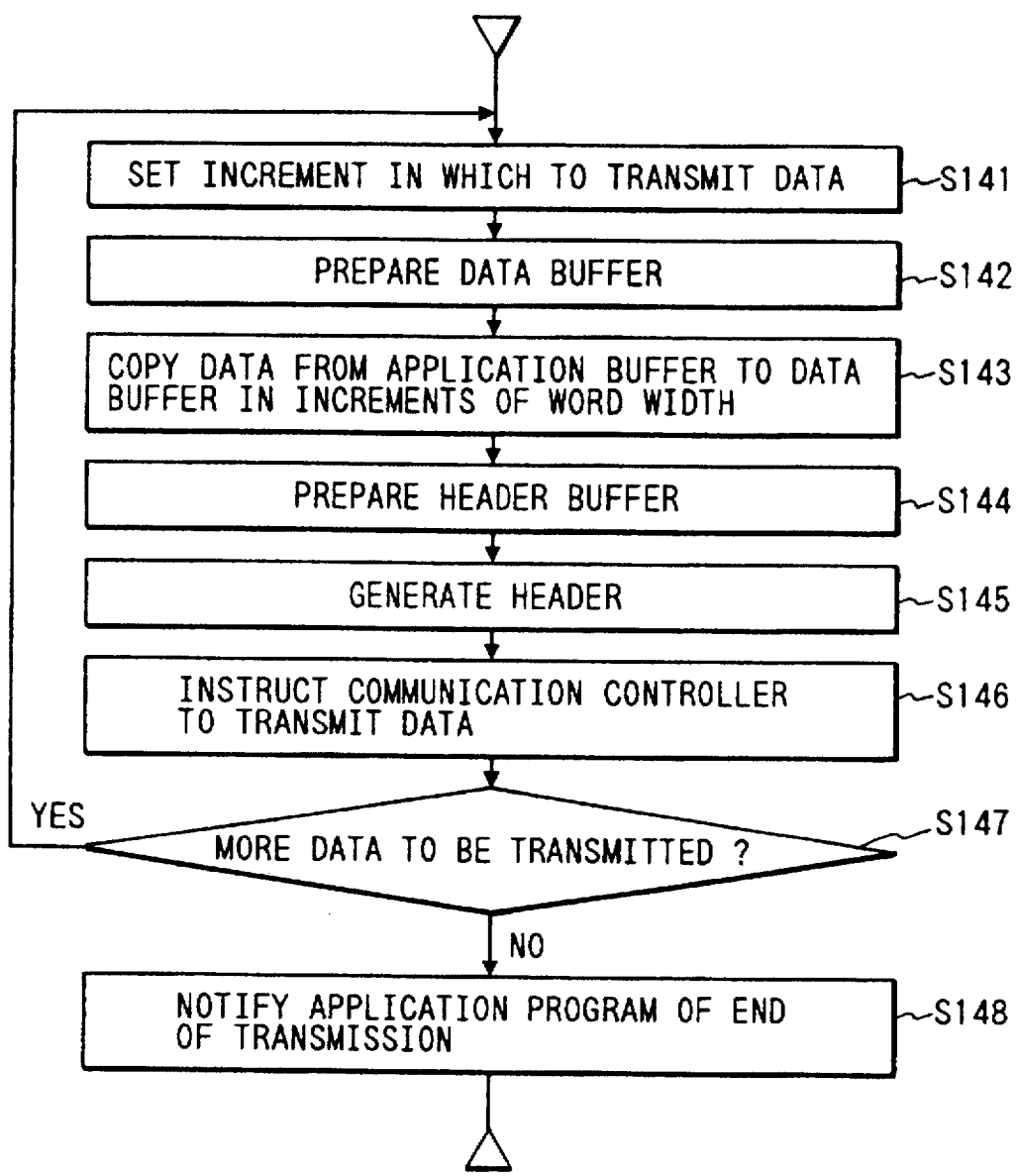
FIG. 14 is a flowchart of steps in which a transmitting program typically operates on the system of FIG. 12.

When the application program 80 designates data transmission, the transmitting program 83 operates in the steps shown in FIG. 14. In step 141 of FIG. 14, the increment in which to transmit application data is set for an integer multiple of the word width in accordance with the maximum amount of data that may be transmitted over the transmission line 13 at a time.

The steps for calculating the increment in which to transmit data are the same as those in FIG. 10 and will not be discussed further.

Figure 17:
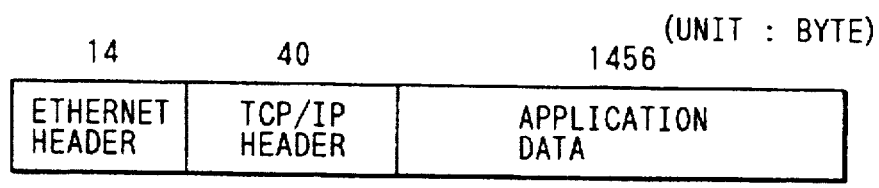
FIG. 17 is a view of the frame format for an Ethernet LAN using the system of FIG. 12.

FIG. 17 illustrates the frame format in effect when the system processors in the transmitter 8 and receiver 9 are a 64-bit processor each having a word width of eight bytes and employing the transmission line 13 based on the Ethernet specifications, with the transmitting program 83 and receiving program 93 utilizing TCP/IP as the communication protocols. The Ethernet header length is 14 bytes, TCP/IP header length is 40 bytes, and the increment in which to transmit application data is 1,456 bytes, i.e., an integer multiple of eight. Although this increment is four bytes less than the maximum data increment, it permits high-speed data copy between buffers. As a result, the performance of data communication is improved.

Figure 18:
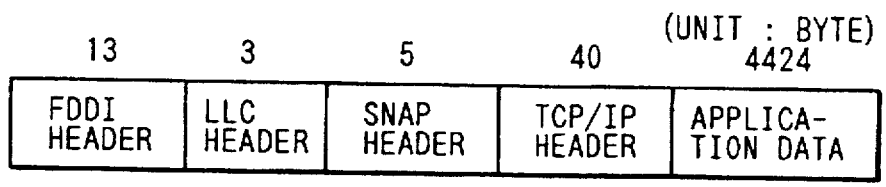
FIG. 18 is a view of the frame format for an FDDI LAN using the system of FIG. 12.

Likewise, FIG. 18 depicts the frame format in effect when the system processors in the transmitter 8 and receiver 9 are a 64-bit processor each having a word width of eight bytes and employing the transmission line 13 based on the FDDI (Fiber Distributed Data Interface) specifications, with the transmitting program 83 and receiving program 93 utilizing TCP/IP as the communication protocols. The FDDI header length is 13 bytes, an LLC (Logical Link Control) header length is three bytes, a SNAP (Sub Network Access Protocol) header length is five bytes, the TCP/IP header length is 40 bytes, and the increment in which to transmit application data is 4,424 bytes, also an integer multiple of eight. Although this increment is six bytes less than the maximum data increment of 4,430 bytes, it permits high-speed data copy between buffers. That in turn enhances the performance of data communication.

Where the page size of the system processor is 4,096 bytes, the increment in which to transmit application data may be set for 4,096 bytes and the resulting performance of data communication still shows appreciable improvement.

In step 142 of FIG. 14, the data buffer 84 equivalent in capacity to the data increment calculated above is prepared. The starting address of the data buffer 84 is located on a word boundary. In step 143, part of the application data 82 is copied from the application buffer 81 to the data buffer 84 in increments of the word width. In step 144, the header buffer 86 equivalent in capacity to at least the header length of the communication protocols is prepared. In step 145, header information is generated on a word boundary in the header buffer 86.

In step 146 of FIG. 14, the communication controller 88 receives an instruction of data transmission. Upon receipt of the instruction from the transmitting program 83., the communication controller 88 outputs the header 87 from the header buffer 86 and the application data 85 from the data buffer 84 consecutively onto the transmission line 13. At the end of transmission, the header buffer 86 and data buffer 84 are released. In step 147, a check is made to see if there still remains data to be transmitted. If there does exist data to be sent, step 141 is reached from which the process above is repeated. If there is no more data to be transmitted, step 148 is reached in which the application program 80 is notified of the end of data transmission.

In the flowchart of FIG. 14, the application program 80 and transmitting program 83 act to perform data transmission to the end once given the instruction from the communication controller 88. Alternatively, the two programs may be arranged to wait for an acknowledge response from the receiver 9.

How the receiver 9 operates will now be described. The application program 90 operates in the same steps as those constituting the flowchart of FIG. 7. In step 71 of FIG. 7, the application buffer 91 for reception is allocated so that the starting address will be on a word boundary in the system memory. In step 72, the receiving program 93 of FIG. 13 is started. In step 73, a reception end report is awaited from the receiving program 93.

Figure 15:
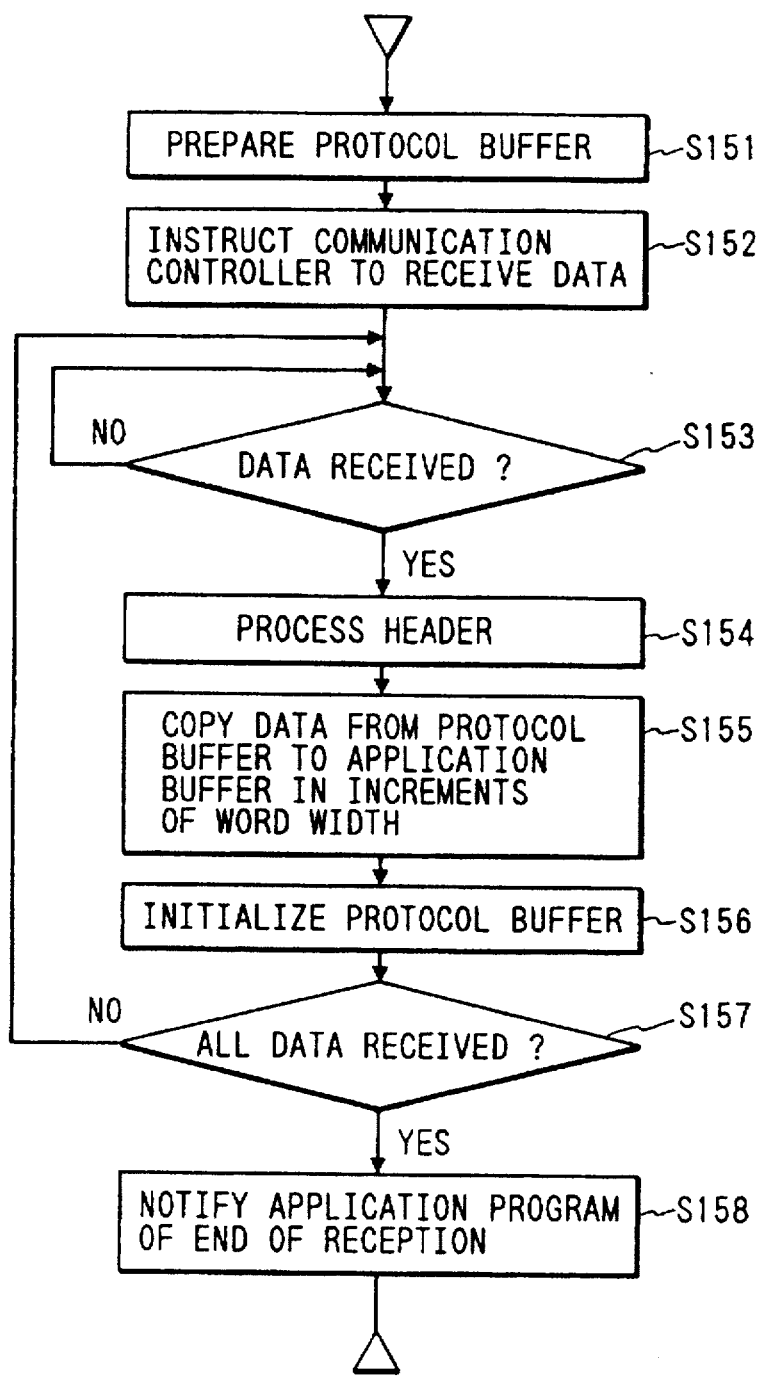
FIG. 15 is a flowchart of steps in which a receiving program typically operates on the system of FIG. 12.

When the application program 90 issues an instruction of data reception, the receiving program 93 starts to operate in the steps constituting the flowchart of FIG. 15. In step 151 of FIG. 15, one or a plurality of protocol buffers 94 are prepared in the system memory. In step 152, the communication controller 96 is instructed to receive data from the transmission line 13 into the protocol buffers 94. At this point, the instruction is given so that the starting address for the application data will be located on a word boundary upon receipt of the frame. The starting address boundary at which to receive the frame is readily obtained using the table of FIG. 9. In step 153, a report of data reception is awaited from the communication controller 96. On receiving the frame data from the transmission line 13 into the protocol buffers 94, the communication controller 96 notifies the receiving program 93 thereof. When notified of the data reception by the communication controller 96, the receiving program 93 goes to step 154 of FIG. 15. In step 154, the header information is retrieved from among the frame data 95 in the protocol buffers 94 and processed. In step 155, the application data excluding the header information is retrieved and copied into the application buffer 91 starting from the location immediately following the already received data. Since the length of the preceding data is an integer multiple of the word width, the starting address at which to store the next data is located on a word boundary. With the application buffer 91 and protocol buffers 94 coinciding with each other in terms of data address boundaries, data may be copied to the two buffers in increments of the word width. In step 156, the protocol buffers 94 used above is initialized for another data reception process. In step 157, a check is made to see if there still exists data to be received. If there does remain data to be received, step 153 is reached again for another data reception process. If all data is found to be received, step 158 is reached. In step 158, the application program 90 is notified of the end of data reception, and the process comes to an end.

Figure 16:
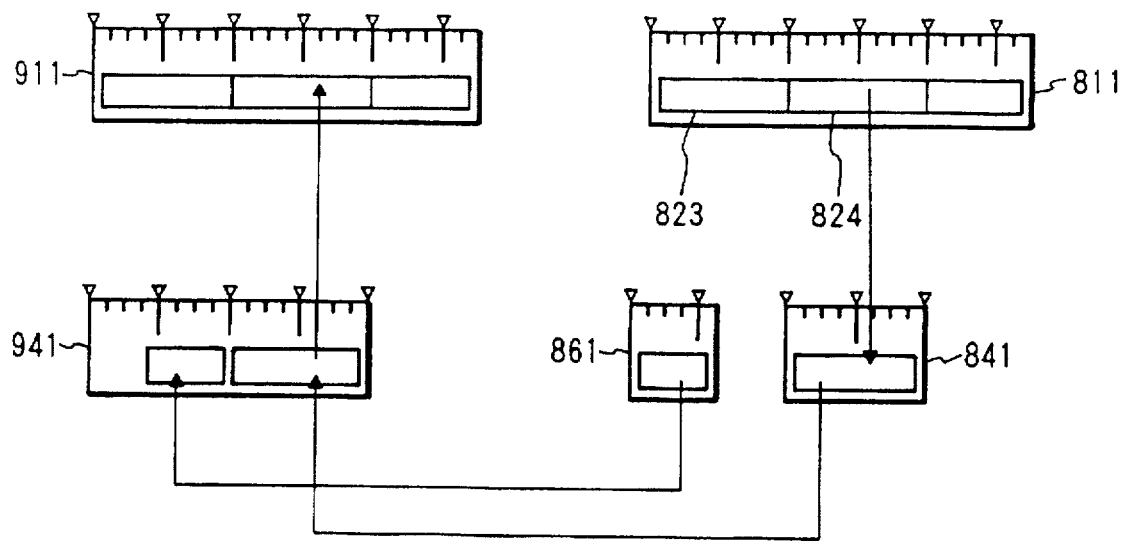
FIG. 16 is a view illustrating how data is typically moved by the system of FIG. 12.

FIG. 16 shows how data is typically moved between buffers when the data communication system of FIG. 13 is operated according to the flowcharts of FIGS. 5, 7, 14 and 15. As in FIG. 11, each division in a buffer represents a one-byte address, the addresses getting higher from left to right. Each of the inverted triangles points to a word boundary. In the example of FIG. 16, the maximum increment in which to transmit data over the transmission line at a time is 10 bytes. Since the word width of the system processor is four bytes, the increment in which to transmit application data is set for eight bytes, starting from step 141 of FIG. 14. The example of FIG. 16 shows that after the first eight bytes of application data 823 are transmitted from an application buffer 811, the next eight bytes of application data 824 are being transmitted and received. The header information for use with the communication protocols is five bytes long. According to steps 143 through 145 in FIG. 14, the starting address of the application data and that of the header information are on a word boundary each, the data and the information being held respectively in a data buffer 841 and a header buffer 861 on the transmitter side. At this point, data may be copied from the application buffer 811 to the data buffer 841 in increments of the word width (i.e., 4 bytes) because the starting address boundaries in the two buffers coincide with each other.

On the receiver side, the starting address of frame data to be placed in a protocol buffer 941 is located on a three-byte boundary, and the starting address of application data is located on a word boundary, starting in step 152 of FIG. 15. Application data is copied at high speed in increments of the word width from the protocol buffer 941 to an application buffer 911. This is because the starting address boundaries in the two buffers coincide with each other.

As described and according to the invention, data may be moved at high speed between buffers. This feature significantly boosts the throughput of the entire communication system.

As many apparently different embodiments of this invention may be made without departing from the spirit and scope thereof, it is to be understood that the invention is not limited to the specific embodiments thereof except as defined in the appended claims.

What is claimed is:

1. In a data transmission system transmitting data by frames, each frame including a communication header and an application data in a data field in the frame, a transmission line for sending said frames, a processor for processing application data under a communication protocol, and a system memory for storing said application data, a data communication method comprising:

a step of processing said application data by words each having a basic word width of plural bytes, said basic word width being a unit length for accessing and processing by said processor;

a step of deciding a maximum available length of an application data included in a sending frame, by deciding a maximum length of said sending frame as a maximum available length in said transmission line, said maximum available length of the application data being an integer times of said basic word width; and a step of sending the frame of the decided maximum available length through said transmission line.

2. A data communication method according to claim 1, further comprising:

a step of sending all the application data in one frame, when the length of said all the application data is shorter than the maximum available length of the data field in said one frame, said maximum available length of the one frame being decided by the maximum available data length of said transmission line.

3. A data communication method according to claim 1, wherein said transmission line is a standard IEEE 802.3 LAN, said basic word width is 64 bits, and the application data length of said integer times of said basic word width is 1456 bytes.

4. A data communication method according to claim 1, wherein said transmission line is an FDDI LAN, said basic word width is 64 bits, and the application data length of said integer times of said basic word width is 4424 bytes.

5. A data communication method according to claim 1, further comprising:

a step of deciding a word boundary of a starting address of said application data included in the sending frame.

6. In a data transmission system transmitting data by frames, each frame including a communication header and an application data in a data field in the frame, a transmission line for sending said frames, a process system for processing the application data under a communication protocol, and a system memory for storing application data, a data communication method comprising:

a step of processing said application data by words each having a basic word width of plural bytes, said basic word width being a unit length for accessing and processing by said processor system;

a step performed by said processor system, of controlling addresses in said system memory by pages composed of a plurality of said words;

a step of deciding a maximum available length of an application data included in a sending frame, by deciding a maximum available length of said sending frame as a maximum available length in said transmission line, said maximum available length of the application data being an integer times of said basic word width and said page; and a step of sending the frame of the decided maximum available length through said transmission line.

7. A data communication method according to claim 6, further comprising:

a step of sending the application data in a plurality of frames each including a part of the length of said application data, when said maximum available length of said application data in a frame is shorter than the length of said application data.

8. A data communication method according to claim 6, further comprising:

a step of deciding a word boundary of a starting address of said application data included in the sending frame.

9. A data transmission system transmitting data by frames, each frame including a communication header and an application data in a data field in the frame, the system comprising:

a transmission line for sending said frames;

a processor for processing application data under a communication protocol;

a system memory for storing said application data;

means in said processor for processing said application data by words each having a basic word width of plural bytes, said basic word width being a unit length for accessing and processing performed by said processor;

means in said processor for deciding a maximum available length of an application data included in a sending frame, by deciding a maximum available length of said sending frame as a maximum available length in said transmission line, said maximum available length of the application data being an integer times of said basic word width; and means for sending the frame of the decided maximum available length through said transmission line.

10. A data communication system according to claim 9, wherein the length of the application data in the sending frame is shorter than a maximum available data length preliminarily given to said transmission line, and said integer times is the maximum length available through said transmission line.

11. A data communication system according to claim 9 further comprising:

means for sending all the application data in one frame, when the length of said all the application data is shorter than the maximum available length of the data field in said one frame, said maximum available length of the one frame being decided by the maximum available data length of said transmission line.

12. A data communication system according to claim 9, wherein said transmission line is a standardized IEEE 802-3 LAN, said basic word width is 64 bits, and the application data length of said integer times of said basic word width is 1456 bytes.

13. A data communication system according to claim 9, wherein said transmission line is an FDDI LAN, said basic word width is 64 bits, and the application data length of said integer times of said basic word width is 4424 bytes.

14. A data transmission system transmitting data by frames, each frame including a communication header and an application data in a data field in the frame, the system comprising:

a transmission line for sending said frames;

a processor system for processing application data under a communication protocol;

a system memory for storing said application data;

means in said processor system for processing said application data by words each having a basic word width of a plural bytes, said basic word width being a unit length for accessing and processing performed by said processor system;

means in said processor system for controlling addresses in said system memory by pages composed of a plurality of said words;

means in said processor system for deciding a maximum available length of an application data included in a sending frame, by deciding a maximum available length of said sending frame as a maximum available length in said transmission line, said maximum available length of the application data being an integer times of said basic word width and said page; and means for sending the frame of the decided maximum available length through said transmission line.

15. A data communication system according to claim 14, wherein the length of the application data in the sending frame is shorter than a maximum available data length preliminarily given to said transmission line, and said integer times is the maximum length available through said transmission line.

16. A data communication system according to claim 14, further comprising:

means for sending the application data in a plurality of frames each including a part of the length of said application data, when said maximum available length of said application data in a frame is shorter than the length of said application data.

* * * * *